Jan. 3, 1961     J. W. DRENNING     2,967,270
DIRECT CURRENT MOTOR CONTROL
Filed Jan. 27, 1958
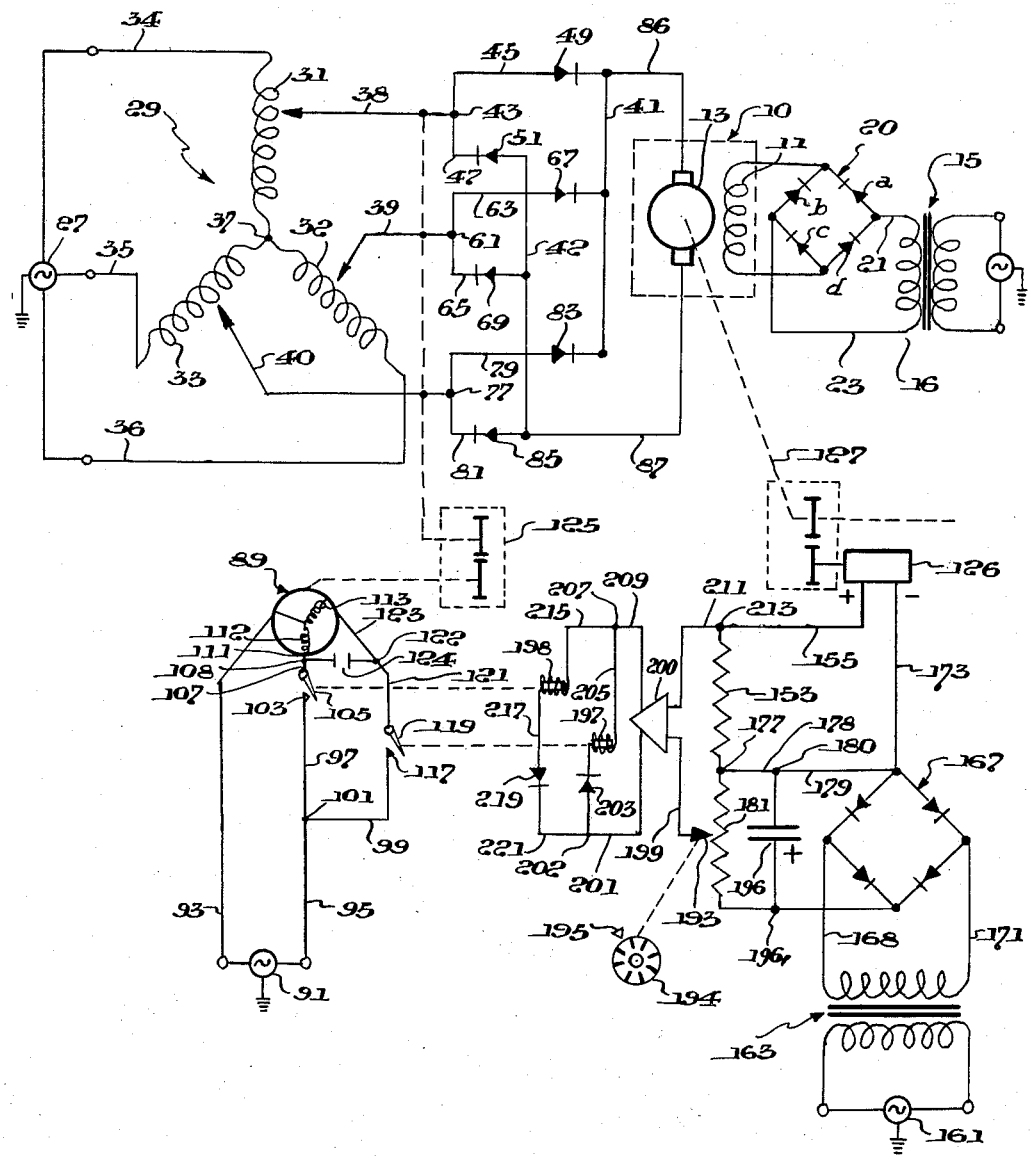
INVENTOR.
JOHN W. DRENNING
BY
Oscar B. Brumback
his ATTORNEY

United States Patent Office 2,967,270
Patented Jan. 3, 1961

2,967,270

DIRECT CURRENT MOTOR CONTROL

John W. Drenning, Baltimore, Md., assignor to Koppers Company, Inc., a corporation of Delaware Filed Jan. 27, 1958, Ser. No. 711,301

4 Claims. (Cl. 318—317)

This invention relates generally to the control of electric motors and more particularly to the control of the speed of a direct current motor.

Among the problems confronting most users of direct current motors for driving heavy duty machinery are the problems of obtaining direct current from alternating current and of controlling and adjusting the speed of the direct current motor. Heretofore, the most widely used means for converting alternating current to direct current was to connect a D.C. generator to an A.C. motor or, as it is sometimes called, the use of motor-generator sets, but this system is costly to install and maintain, is bulky, and has universally recognized inefficiencies. Conventionally the speed control for D.C. motors has consisted of hand operated rheostats, for the most part, but these are unsatisfactory because there is a great likelihood of lack of continuity and smoothness of operation in changing from one speed to another. The need for smooth changes in speed is especially great in industries like the paper box making machine industry where a multitude of separate machines, each having large inertial forces, are connected to a single D.C. drive motor so that in starting or stopping, the speed of the whole line of machines must be increased or decreased slowly and at a constant rate to prevent the torques in the respective machines from getting too far out of line with each other.

The object of this invention, therefore, is to provide for the smooth change in speed of a D.C. motor.

Another object of the invention is to provide a more efficient and inexpensive rectifier for converting A.C. to D.C. and a manual remote speed control for D.C. drives which causes a constant controlled rate of deceleration and acceleration.

A further object is to provide for the presetting of the speed at which a D.C. motor is to be operated and to bring the motor from its present speed to the preset speed at a constant rate.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

The single sheet of drawings schematically illustrates the novel control and rectifier for a D.C. motor.

This invention contemplates a novel arrangement using dry type rectifiers for converting A.C. to D.C. for the armature and/or field of a D.C. motor and for controlling the speed of the motor by producing a signal proportional to the speed of the D.C. motor by providing a reference signal corresponding to the pre-selected speed for the motor, and comparing these signals and changing the voltage to the D.C. motor at a constant rate until the motor reaches the pre-selected speed.

Referring more particularly now to the drawing, motor 10 is a D.C. motor of conventional type having a field winding 11 and an armature 13 supplied with D.C. current.

The direct current for field winding 11 is derived from a suitable source of alternating current. This A.C. is supplied by a conventional coupling transformer 15 whose secondary winding 16 is connected to a rectifier bridge 20 by leads 21 and 23. This rectifier bridge may embody any type of standard rectifier units, $a$, $b$, $c$, $d$, well known in the art, such as high vacuum or gas filled tube type or dry-type rectifier units similar to the type for supplying direct current to the armature 13 which will be described hereinafter.

The armature 13 of the D.C. motor 10 is supplied with power from a suitable source of alternating current 27 by an arrangement which includes a three phase autotransformer 29 and rectifiers, described hereinafter, whereby the A.C. is supplied through three windings 31, 32, and 33 of the transformer 29 through leads 34, 35, and 36, each of these leads being connected to one end of one winding and all three windings being connected to junction 37. Each of the windings of the autotransformer 29 has a moveable wiper 38, 39, 40 respectively. Each of these wipers is connected to a bus lead 41 and a bus lead 42 by suitable junctions and leads. Each bus lead is connected to an opposite end of armature 13 by suitable leads so that with properly placed dry type rectifiers such as selenium, germanium or silicon type rectifiers well known in the art connected to these bus leads, as shown and described hereinafter, the armature of motor 10 is supplied with D.C.

A junction 43 of wiper 38 is connected by leads 45 and 47 to the bus leads 41 and 42 and includes a dry type rectifying unit 49 connected to lead 45 which allows current to flow in only one direction and a dry type rectifying unit 51 connected to lead 47 which allows current to flow only in the other direction. A junction 61 of wiper 39 is connected by leads 63 and 65 to the bus leads 41 and 42 and includes a dry type rectifying unit 67 connected to lead 63 which allows current to flow only in one direction and a dry type rectifying unit 69 connected to lead 65 which allows current to flow only in the other direction. A junction 77 of wiper 40 is connected by the leads 79 and 81 to the bus leads 41 and 42 and includes a dry type rectifying unit 83 connected to lead 79 which allows current to flow only in one direction and a dry type rectifying unit 85 connected to lead 79 which allows current to flow only in the other direction. As will be understood from the foregoing and the arrows of the drawing indicating the direction of current flow, rectifiers 49, 67 and 83 are connected to bus lead 41 so that they allow current to flow only in one direction during each half cycle of the A.C. supply from the autotransformer 29 and rectifiers 51, 69, and 85 are connected to bus lead 42 so that they allow current to flow only in the other direction during the other half cycle of the A.C. supply from the autotransformer 29. Bus lead 41 is connected to one end of the armature 13 by lead 86 and bus lead 42 is connected to the other end of armature 13 by lead 87 and to this end full wave rectification to motor 10 is accomplished.

The foregoing has described the energization of the motor 10 and as long as wipers 38, 39, and 40 are in one position the motor 10 tends to turn at a constant speed. In accordance with the invention, a novel arrangement is provided for adjusting these wipers at a constant rate so as to change the speed of the motor 10 at a constant rate. This entails changing the voltage from the autotransformer at a constant rate because changing the voltage from the autotransformer changes the speed of the motor 10.

In accordance with the invention motor 89 controls the position of the wipers 38, 39, and 40 with respect to their associated windings of autotransformer 29 so as to increase or decrease the voltage supplied from the autotransformer 29. Motor 89 is a conventional constant speed two phase alternating current motor and it is connected to a suitable source of alternating current 91 through leads 93 and 95. Lead 95 is connected to leads 97 and 99 at junction 101. Lead 95 supplies AC current to the coil 112 of motor 89 through lead 97, contact point 103 and normally open armature 105, lead 107, junction 108 and lead 111 when armature 105 and contact 103 are engaged. Lead 95 supplies A.C. to the coil 113 of motor 89 through lead 99, contact point 117, normally open armature 119, lead 121, junction 122 and lead 123 when armature 119 and contact 117 are engaged. A capacitance 124 is connected between junction 108 and 122 so that by selectively engaging armature 105 or 119 with their respective contacts an arrangement is provided which allows motor 89 to be rotated in two directions, i.e., one direction when armature 105 is closed with contact 103 and the opposite direction when armature 119 is closed with contact 117.

The mechanical connection between motor 39 and the three wipers of autotransformer 29 comprises a suitable gear box 125 and connections. The ratio of the output shaft of this gear box to the speed of motor 39 connected to the input of the gear box determines the rate at which the wipers of the autotransformer 29 are moved and the speed of the change in position of these wipers determines the rate of increase or decrease of the speed of motor 10. Thus the speed of the output shaft of the gear box determines the speed of the change in position of the wipers and the rate of acceleration or deceleration of motor 10, and the direction of rotation of the output shaft determines whether the speed of motor 10 is accelerated or decelerated.

The control for motor 89 comprises a novel arrangement of a means for developing a first signal corresponding to the speed of motor 10, a second reference signal corresponding to a desired speed, a means developing a differential directional signal when the first and second signals are unequal and a means for operating motor 89 when the first and second signals are unequal. To this end tachometer generator 126 is connected to the output shaft 127 of motor 10 by a suitable means well known in the art and accordingly the tachometer 126 develops a voltage signal across potentiometer 153 to which it is connected by lead 155 and other appropriate leads corresponding to the speed of the motor 10. To develop a reference signal, an A.C. current source 161 is connected by a coupling transformer 163 to a rectifier bridge 167 by leads 168 and 171. Rectifier bridge 167 may employ high vacuum or gas filled tube type rectifiers or it may embody dry type rectifiers in an arrangement similar to that described above. The rectifier bridge 167 is connected to the negative terminal of tachometer 126 by lead 173 and is connected to a junction 177 by leads 178 and 179 and junction 180. The junction 177 is interposed between potentiometer 153 and potentiometer 181, the latter having a wiper 193 which is moveable by a suitable means such as a hand operated dial 194 with indicia thereon; and capacitance 196 is connected between junction 180 and $196_1$. Thus any difference in voltage between the reference signal and the tachometer output is sensed at a wiper 193. An index 195 cooperates with the indicia on dial 194 to indicate the speed of motor 10 or to preset the speed of motor 10.

Wiper 193 is connected to dial 194 by a suitable means well known in the art and the dial 194 may be rotated is a clockwise or counterclockwise direcion. By rotating the dial in one direction the wiper 193 is moved with relation to potentiometer 181 and thus the difference in voltage across the potentiometer and the wiper may be changed. For instance since the reference potential on the potentiometer 181 from rectifier 167 remains substantially constant, and since the output from tachometer 126 is substantially constant when motor 10 is rotating at a constant rate, by moving wiper 193 the potential from potentiometer 181 to wiper 193 becomes either more positive or more negative.

Relays 197 and 198 are provided which are actuated when current flows across wiper 193. When the reference signal from rectifier bridge 167 to wiper 193 is more positive than the signal from tachometer 126, then current flows from wiper 193 through lead 199, amplifier 200, lead 201, junction 202, rectifier 203 to relay 197, and thence from relay 197 to lead 205, junction 207, lead 209, amplifier 200, lead 211, junction 213 and lead 155 to tachometer 126. When the reference signal from rectifier bridge 167 to wiper 193 is more negative than the signal from tachometer 126 then current flows in the opposite direction, i.e., from tachometer 126 through lead 155, amplifier 200, lead 209, junction 207, lead 215 to relay 198 and thence from relay 198 through lead 217, rectifier 219, lead 221, junction 202, lead 201, amplifier 200, lead 199, wiper 193 to potentiometer 181. When relay 197 is energized armature 119 and contact 117 are engaged, thus actuating motor 10 and when relay 198 is energized its armature 105 and 103 are engaged so that 10 is actuated. Consequently as described above, when the flow of current across wiper 193 is in one direction the motor 89 is actuated in one direction and when the flow of current across wiper 193 is in the other direction the motor 89 is actuated in the other direction. Furthermore the motor 10 is actuated until the output from tachometer 126 equals the reference voltage sensed across wiper 193.

In operation, for example, when the D.C. drive motor 10 is rotating at low speed the potentiometer wiper 193 is in a position at one side of potentiometer 181 so that the voltage or first signal from tachometer 126 is equal to the reference voltage or second signal from rectifier 167 across wiper 193 and index 195 with the indicia on dial 194 indicates this speed. When the dial 194 is rotated to a new setting which is indicated by the index 195 and the indicia on dial 194 this changes the position of wiper 193 so that a current or third signal flows across wiper 193 to tachometer 126. This actuates relay 197 which actuates motor 89 in one direction so that the wipers of the autotransformer 29 are moved to increase the voltage from the autotransformer until the output from tachometer 126 equals the reference output sensed by wiper 193. The rate of change of position of the wipers is proportional to the ratio of the gears in gear box 125 to the speed of motor 89. The voltage from the autotransformer 29 is rectified and thereupon the increased voltage supplied to the armature 13 of motor 10 increases the speed of motor 10 at a constant rate. As the speed of motor 10 increases, the tachometer output increases until there is no current flow across wiper 193. When there is no flow across wiper 193 then relay 197 is de-energized and motor 89 stops rotating. Thus the speed of motor 10 will equal the setting on dial 194. To decrease the speed of the motor 10, the dial 194 is rotated in the opposite direction. This causes current to flow from the tachometer 126 across wiper 193 which actuates relay 198. This in turn causes the motor 89 to rotate in the opposite direction which decreases the voltage on the armature of motor 10 through the same apparatus described above, thus decreasing the speed of the motor 10 at a constant rate until there is no flow of current across wiper 193 at which time the change in speed of motor 10 ceases.

The foregoing has described a novel rectifier for a D.C. motor and a novel control for a D.C. motor whereby the D.C. motor can be changed from one speed to another speed by a manual remote dial so that no matter how fast the dial is turned the rate of change of speed of the D.C. motor is constant and whereby the speed of the D.C. drive can be preset manual remotely.

Although the foregoing has illustrated and described the invention in detail, it is to be expressly understood that the invention is not limited thereto. Various changes can be made in the design and arrangement of the parts without departing from the spirit and scope of the invention as will now be understood by those skilled in the art.

What is claimed is:

1. Apparatus for controlling the speed of a direct current motor by changing the excitation to its armature, comprising a three phase alternating current power source, a direct current motor whose speed is regulated by the voltage on its armature, an autotransformer having a winding connected to each phase of said power source and an adjustable setting on each winding, rectifying means transmitting the output from each winding to said armature, and adjustment means for adjusting the setting of said autotransformer to decrease and increase the voltage to said armature thereby to decrease and increase the speed of said direct current motor, said adjustment means including first means for developing a first signal corresponding to the speed of said direct current motor, second means for developing a second signal corresponding to a predetermined speed of said direct current motor, remote means for manually proportioning the magnitude of said second signal to said first signal to change the predetermined speed of said direct current motor to which said second signal corresponds, and means responsive to said first and second signals including a constant speed motor for varying the setting of said autotransformer when said first and second signals are not equal so as to change the speed of said direct current motor to equalize said first and second signals whereby the setting of said autotransformer is varied at a constant rate regardless of the inequality of said signals.

2. Apparatus for controlling the speed of a direct current motor by changing the excitation to its armature, comprising a three phase alternating current power source, a direct current motor, a three phase autotransformer having a winding connected to each phase of said power source, a wiper moveable on each winding for varying the voltage output from that winding, rectifiers connecting each wiper to said armature, and means for moving each wiper to decrease and increase the voltage output to said armature thereby to decrease and increase the speed of said motor, a tachometer generator for developing a first signal corresponding to the speed of said direct current motor, reference means for developing a second signal corresponding to a predetermined speed of said direct current motor, means for manually proportioning the magnitude of said second signal to change the predetermined speed of said direct current motor, and means including a constant speed motor means responsive to said first and second signals for moving said wipers when said first and second signals are not equal so as to change the speed of said direct current motor to equalize the said first and second signals whereby the setting of said wipers is varied at a constant rate regardless of the inequality of said signals.

3. Apparatus for changing the excitation to the armature of a direct current motor to control the speed of the motor, comprising a three phase power source, a direct current motor, means for connecting the armature of said motor to said three phase power source including an autotransformer having a winding with an adjustable wiper thereon connected to each phase of said power source and six rectifiers, three of which rectifiers are connected to one end of said armature and to one of said wipers respectively for current flow in one direction, and three of which rectifiers are connected to the other end of said armature and to one of said wipers respectively for current flow in the opposite direction, and means for adjusting the setting of said autotransformer wipers to decrease and increase the voltage to said armature thereby to decrease and increase the speed of said direct current motor including a tachometer generator for developing a first signal corresponding to the speed of said direct current motor, reference means for developing a second signal corresponding to a predetermined speed of said direct current motor, remote means manually adjustable for proportioning the magnitude of said second signal to change the predetermined speed of said direct current motor, a constant speed motor for varying the adjustment of said wipers, and means for actuating said constant speed motor when said first and second signals are not equal so as to vary the adjustment of said wipers to change the speed of said motor to equalize the said first and second signals whereby the adjustment of said wipers is varied at a constant rate regardless of the inequality of said signals.

4. A system comprising a three phase alternating current source, a direct current motor having armature and field windings, said field having a constant potential direct current source, means for connecting said armature to said three phase power source including an autotransformer having a winding connected to each phase of said three phase power source, wipers moveable on each winding for increasing and decreasing the output from each winding, rectifiers connecting the output from each of said windings to said armature for supplying unidirectional current thereto, a constant speed motor for moving said wipers, said constant speed motor having forward and reverse windings, a second source of alternating current for energizing said constant speed motor, first contacts between said second source and said forward windings, a first relay for opening and closing said first contacts, second contacts between said second source and said reverse windings, a second relay for opening and closing said second contacts, a first rectifier connected to said first relay for blocking voltage in one direction and for transmitting voltage in the other direction, a second rectifier connected to said second relay for blocking voltage in one direction and for transmitting voltage in the other direction, first and second potentiometers for actuating said first and second relays, said potentiometers being connected in opposition through a common terminal, a direct current tachometer generator having an input shaft connected to said direct current motor and having output lead connected to the free terminal of said first potentiometer and a second lead connected to said common terminal, a constant control direct current source having a lead connected to the free terminal of said second potentiometer and a lead connected to said common terminal, and a manual remotely operated slider on said second potentiometer transmitting current therefrom to said first relay and to said second relay for selective energization of said relays when said constant control voltage is different from the voltage supplied from said direct current tachometer generator.

References Cited in the file of this patent

UNITED STATES PATENTS

| | | |
|---|---|---|
| 2,530,993 | Roman | Nov. 21, 1950 |
| 2,551,620 | Meinema | May 8, 1951 |
| 2,677,085 | Sikorra | Apr. 27, 1954 |
| 2,818,541 | Weler et al. | Dec. 31, 1957 |